United States Patent Office 3,431,283
Patented Mar. 4, 1969

3,431,283
POLYMERISABLE BIS-AMIDES
Edward George Gazzard and James Nairn Greenshields, Manchester, England, assignors to Imperial Chemical Industries Limited, London, England, a corporation of Great Britain
No Drawing. Filed Oct. 21, 1965, Ser. No. 500,356
Claims priority, application Great Britain, Oct. 30, 1964, 44,350/64
U.S. Cl. 260—345.7  9 Claims
Int. Cl. C07d 7/10

ABSTRACT OF THE DISCLOSURE

Polymerizable bis-amides of the formula:

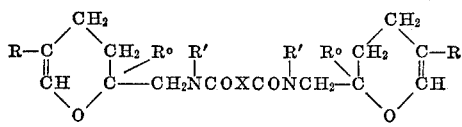

wherein $R^o$ and $R$ represent hydrogen, lower alkyl or halogen; $R'$ represents hydrogen or a hydrocarbon radical, and $X$ represents the residue of an aromatic or saturated aliphatic dicarboxylic acid, $X(COOH)_2$.

---

This invention relates to new polymerisable bis-amides containing two dihydropyran nuclei, to a process for manufacturing such amides and to the manufacture of polymers and copolymers of such amides.

Thus according to the present invention there are provided polymerisable bis-amides of the general Formula I.

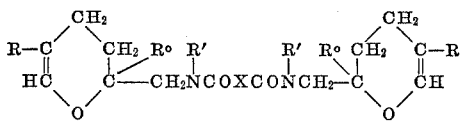

wherein $R^o$ and $R$ represent hydrogen, a hydrocarbon radical or a halogen atom, $R'$ represents hydrogen or a hydrocarbon radical, and $X$ represents the residue of an aromatic or saturated aliphatic dicarboxylic acid $$X(COOH)_2$$

The term hydrocarbon radical includes alkyl, cycloalkyl, aryl, aralkyl and alkaryl radicals.

Examples of radicals which may be represented by $R^o$ and $R$ include hydrogen, methyl, ethyl, propyl, isopropyl, octyl, phenyl and chlorine. The compounds of the present invention which are particularly useful are those in which $R^o$ and $R$ represent hydrogen or lower alkyl in particular methyl.

Examples of radicals which may be represented by $R'$ include hydrogen, methyl, ethyl, n-propyl, isopropyl, n-butyl, sec-butyl, t-butyl, isobutyl, pentyl, hexyl, dodecyl, cetyl, cyclohexyl, benzyl and phenyl.

Examples of the radical $X$ which is the residue of an aromatic or saturated aliphatic dicarboxylic acid $$X(COOH)_2$$

include the residues of oxalic, adipic, sebacic, succinic, pimelic, suberic, azelaic, phthalic, isophthalic and terephthalic acids.

Where the dicarboxylic acid $X(COOH)_2$ is oxalic acid, the residue $X$ represents the valency bond joining the two carboxylic acid residues, in all other acids $X$ represents the organic radical to which the carboxylic acid radicals are attached.

The polymerisable bis-amides of the present invention are substituted bis-amides of the aromatic or saturated aliphatic dicarboxylic acids $X(COOH)_2$, the substituent being the 3,4-dihydro-2H-pyran-2-methyl radical or a similar radical in which the pyran ring is substituted in the 2- and/or 5-positions. When $R'$ represents a substituent other than hydrogen the bis-amides are completely substituted on the nitrogen atoms.

Examples of the polymerisable bis-amides of the present invention include:

N,N'-bis-(3,4-dihydro-2H-pyran-2-methyl)phthalamide,
N,N'-bis-(3,4-dihydro-2H-pyran-2-methyl)adipamide,
N,N'-bis-(2,5-dimethyl-3,4-dihydro-2H-pyran-2methyl) phthalamide,
N,N'-bis-(2,5-dimethyl-3,4-dihydro-2H-pyran-2-methyl) succinamide,
N,N'-dibenzyl-N,N'-bis-(3,4-dihydro-2H-pyran-2-methyl)phthalamide,
N,N'-bis(3,4-dihydro-2H-pyran-2-methyl)oxamide,
N,N'-dimethyl-N,N'-bis-(2,5-dimethyl-3,4-dihydro-2H-pyran-2-methyl)succinamide, and
N,N'-bis(2,5-dimethyl-3,4-dihydro-2H-pyran-2-methyl) oxamide.

The polymerisable bis-amides of the present invention may be manufactured by reacting a 2-aminoethyl-3,4-dihydro-2H-pyran (optionally ring substituted in the 2- and/or 5-positions) or a N-monosubstituted derivative thereof with an aromatic or saturated aliphatic dicarboxylic acid or an amide-forming derivative thereof such as an acid halide or ester.

Thus according to a further feature of the present invention there is provided a process for the manufacture of polymerisable bis-amides as hereinbefore defined which comprises reacting a 2-aminomethyl-3,4-dihydro-2H-pyran derivative of the general Formula II.

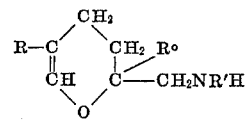

(II)

wherein $R^o$, $R$ and $R'$ are as hereinbefore defined with an aromatic or saturated aliphatic dicarboxylic acid or an amide forming derivative thereof.

Examples of 2-aminomethyl-3,4-dihydro-2H-pyran derivatives of the general Formula II which may be used as starting materials in the present process include:

2-aminomethyl-3,4-dihydro-2H-pyran,
2-aminomethyl-2,5-dimethyl-3,4-dihydro-2H-pyran,
2-aminomethyl-2,5-diethyl-3,4-dihydro-2H-pyran,
2-N-methylaminomethyl-2,5-dimethyl-3,4-dihydro-2H-pyran,
2-N-methylaminomethyl-3,4-dihydro-2H-pyran,
2-N-phenylaminomethyl-3,4-dihydro-2H-pyran,
2-N-cyclohexylaminomethyl-3,4-dihydro-2H-pyran,
2-N-benzylaminomethyl-3,4-dihydro-2H-pyran,
2-aminomethyl-2,5-dichloro-3,4-dihydro-2H-pyran.

As examples of aromatic or saturated aliphatic dicarboxylic acids which can be used in the present process there may be mentioned oxalic acid, adipic acid, sebacic acid, succinic acid, pimelic acid, suberic acid, azelaic acid, phthalic acid, isophthalic acid, and terephthalic acid.

As examples of amide forming derivatives of such dicarboxylic acids which can be used there may be mentioned esters and acid halides.

Examples of esters of such dicarboxylic acids which may be used include the methyl, ethyl, propyl and butyl esters.

Examples of acid halides of such carboxylic acids which can be used include the acid chlorides and acid bromides.

The reaction leading to the formation of the polymerisable bis-amides of the present invention is carried out using known techniques, for example when using the ester or acid chloride of a dicarboxylic acid an acid binding agent is normally employed.

The polymerisable bis-amides of the present invention contain two polymerisable vinyl ether groupings and may be used in the manufacture of polymeric materials either as one of the main polymer forming components or as cross-linking agents.

The polymerisable bis-amides may be polymerised to give homopolymers by the action of catalysts known to polymerise vinyl ethers, they may also be copolymerised with other vinyl ethers using the same type of catalyst.

Suitable catalysts include both acidic and nonacidic catalysts, particularly acidic catalysts. Examples of suitable catalysts include strong proton-donating acids such as hydrochloric acid, p-toluene sulphonic acid and Lewis acids such as trimethoxy boroxine and boron trifluoride conveniently employed as the etherate, $BF_3(C_2H_5)_2O$. Other suitable acid catalysts include ferric chloride, stannic chloride, phosphorus pentachloride, phosphoric acid, boron trifluoride dihydrate, hydrogen fluoride, antimony pentafluoride, hexafluorophosphoric acid, lead fluoborate, antimony fluorborate, sulphuric acid and silico-tungstic acid, and non-acid catalysts such as iodine and iodine perchlorate, iodine acetate, iodine triphosphate and iodine triacetate and triphenyl methyl derivatives of anions having a low ester forming tendency, for example triphenylmethyl perchlorate, hexachloroantimonate, chloromercurate, chlorozincate and chloroaluminate.

Examples of other vinyl ethers which may be used in the formation of copolymers with the polymerisable bis-amides of the present invention include methyl vinyl ether, ethyl vinyl ether, hexyl vinyl ether, divinyl ether, diisopropenyl ether, diethylene glycol divinyl ether, butane diol divinyl ether and vinyl ethers containing one or more dihydropyran nucleii such as 3,4-dihydro-2H-pyran, 3,4-dihydro-2H-pyran-2-methyl (3,4-dihydro-2H-pyran-2-carboxylate) also known as acrolein tetramer, bis-esters of 2-hydroxymethyl-3,4-dihydro-2H-pyran with di-basic acids such as succinic acid, adipic acid and phthalic acid, and aldol-type condensation products derived from acrolein dimer.

If the polymerisation or copolymerisation of the substituted amides of the present invention is carried out under such conditions that a foam-forming gas is generated a foamed polymer will be produced.

A foam-forming gas may be generated by methods know in the art, for example by incorporating a low boiling inert liquid such as a halogenated aliphatic hydrocarbon into the polymerisation mixture; the heat of polymerisation volatilising the inert liquid to form small bubbles in the polymerised mass.

Suitable halogenated hydrocarbons include trichloromonofluoromethane, dichlorotetrafluoroethane, trichlorotrifluoroethane, dibromodifluoromethane, dichlorohexaflurocyclobutane, methylene chloride, chloroform, trichloroethylene, carbon tetrachloride and perchloroethylene.

In the manufacture of foamed polymers from the polymerisable bis-amides it is advantageous to incorporate in the polymerisation mixture a surfactant such as is used in the manufacture of foamed polyurethanes, for example a silicon surfactant such as siloxane-oxyalkylene copolymer for example of the type described in British Patent No. 892,136.

The manufacture of homopolymers and copolymers from the polymerisable bis-amides of the present invention may be carried out by methods well known in the art for vinyl ether polymerisation.

Other polyreactive materials reactive with vinyl ethers, such as polyhydric alcohols, polyhydric phenols, dicarboxylic acids and epoxy compounds may also be incorporated in the polymerisation mixture in particular when manufacturing copolymers from the substituted amides of the present invention.

The polymerisable bis-amides of the present invention may also be reacted with water to form the 6-hydroxy derivatives of the general formula

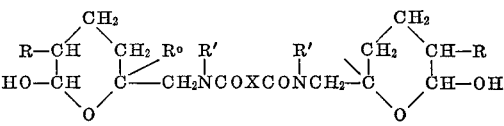

The 6-hydroxy derivatives of the above general formula may also exist in the tautomeric hydroxy aldehyde form.

The 6-hydroxy derivatives in either tautomeric form may also be used as polymer forming intermediates by reacting them with compounds containing active hydrogen atoms for example amines and active methylene compounds.

Foamed polymers or copolymers made from the polymerisable bis-amides of the present invention may be used for insulation or as constructional materials.

Homopolymers and copolymers produced from the polymerisable bis-amides of the present invention are also useful as surface coatings, textile finishes and in non-woven textile materials.

There may be incorporated in the manufacture of such polymers, agents such as are normally incorporated in the manufacture of polymeric materials, for example, plasticisers, pigments, colouring materials and fire retardants.

The invention is illustrated but not limited by the following examples in which all parts and percentages are by weight except where otherwise stated.

EXAMPLE 1

Preparation of N,N'-bis(3,4-dihydro-2H-pyran-2-methyl) phthalamide

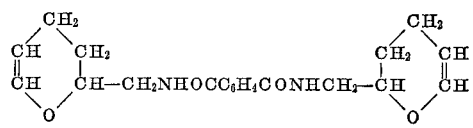

22.6 part of 2-aminomethyl-3,4-dihydro-2H-pyran, 19.4 parts dimethyl phthalate and 2.0 parts sodium methoxide solution (11% by weight in methanol) are heated at approximately 110–120° C. until no more methanol is removed. The crystalline residue obtained on cooling is filtered, is washed and is crystallised from methanol to give 25.3 parts of material of melting point 150.4° C.

EXAMPLE 2

Preparation of a foamed copolymer from the product of Example 1

10 parts acrolein tetramer, 2.5 parts N,N'-bis(3,4-dihydro-2H-pyran-2-methyl)phathalamide, 0.18 part of a siloxane oxyalkylene copolymer, and 4.5 parts trichloromonofluoromethane are mixed with stirring and there is then added to the mixture 1.5 parts of a 10% solution of boron trifluoride etherate in polypropylene glycol of molecular weight 425. The mixture is then allowed to foam and gives a light brown cellular polymeric material.

EXAMPLE 3

Preparation of N,N'-bis(3,4-dihydro-2H-pyran-2-methyl) adipamide 22.6 parts 2-aminomethyl-3,4-dihydro-2H-pyran, 17.4 parts dimethyl adipate, and 2.0 parts sodium methoxide solution (11% by weight sodium methoxide in methanol) are heated, with stirring at 110–120° C. for 6 hours when no further methanol is evolved. The crystalline residue obtained on cooling, is filtered, is washed with ether and is recrystallised from a methanol-water mixture to give 5.0 parts material M.P. 133–134° C.

Distillation of the filtration liquors to remove volatile materials boiling up to 163° C./0.1 mm. Hg, leaves a further 5.8 parts N,N'-bis(3,4-dihydro-2H-pyran-2-methyl)adipamide.

EXAMPLE 4

Preparation of a foamed copolymer from the product of Example 3

15 parts acrolein tetramer, 2.5 parts N,N'-bis(3,4-dihydro-2H-pyran-2-methyl)adipamide, 0.13 part of a siloxane oxyalkylene copolymer, and 2.1 parts trichloromonofluoromethane are mixed with stirring and there is added 2.2 parts of a 10% solution of borontrifluoride etherate in polypropylene glycol of molecular weight 425. The mixture is allowed to foam to a light brown cellular polymeric structure.

EXAMPLE 5

Preparation of N,N'-bis(3,4-dihydro-2H-pyran-2-methyl)oxamide 2.6 parts 2-aminomethyl-3,4-dihydro-2H-pyran is dissolved in 88 parts dry benzene. The solution is stirred at 25° C. and there is added, continuously over 30 minutes, 14.6 parts diethyl oxalate. After the addition the mixture is heated to reflux, at 65–70° C., for 1 hour. The reaction mixture is cooled and is filtered. The filter cake is dried to give 26 parts N,N'-bis(3,4-dihydro-2H-pyran-2-methyl)oxamide M.P. 161–162° C. Recrystallisation from benzene gives 24 parts material M.P. 162–163° C.

EXAMPLE 6

Preparation of a foamed copolymer from the product of Example 5

10 parts acrolein tetramer, 2 parts N,N'-bis(3,4-dihydro-2H-pyran-2-methyl)oxamide, and 1.2 parts diphenylol propane are warmed to give a clear solution. The mixture is cooled and there is added, with stirring, 0.12 part of a siloxane oxyalylene copolymer and 6 parts trichloromonofluoromethane followed by 1.5 parts of a 10% solution of boron trifluoride etherate in polypropylene glycol of molecular weight 425. The mixture is allowed to foam to a slightly off white cellular polymeric structure.

EXAMPLE 7

Preparation of N,N'-dimethyl-N,N'-bis(2,5-dimethyl-3,4-dihydro-2H-pyran-2-methyl)succinamide 11.0 parts 2,5-dimethyl-2-N-methylaminomethyl-3,4-dihydro-2H-pyran, 5.1 parts dimethyl succinate, and 0.88 part by volume of sodium methoxide solution in methanol, containing 0.24 part sodium methoxide, are heated, with stirring at 170–180° C. for 5 hours. The reaction mixture is cooled, is dissolved in ether and is filtered. The filtered solution is distilled to give 3.0 parts viscous liquid product of B.P. 174–200° C./0.5 mm. Hg.

EXAMPLE 8

Preparation of N,N'-bis(2,5-dimethyl-3,4-dihydro-2H-pyran-2-methyl)oxamide 5.64 parts 2,5-dimethyl-2-aminomethyl - 3,4 - dihydro-2H-pyran, 2.36 parts diethyl oxalate, and 17.4 parts dry benzene are heated at reflux, with stirring, for 1 hour. The reaction mixture is cooled and is filtered to give 4.3 parts of a white, waxy solid, M.P. 69–70° C.

Recrystallisation from a methanol-water mixture gives 3.4 parts white waxy solid M.P. 70–71° C.

EXAMPLE 9

Preparation of a foamed copolymer from the product of Example 8

10 parts acrolein tetramer, 2 parts N,N'-bis(2,5-dimethyl-3,4-dihydro-2H-pyran-2-methyl)oxamide, and 2 parts diphenylol propane are warmed to give a clear solution. The mixture is cooled and is stirred and there is added 0.12 part of a siloxane oxyalkylene copolymer, and 3.5 parts trichlorofluoromethane followed by 1.2 parts of a 10% solution of boron trifluoride etherate in polypropylene glycol of molecular weight 425. The mixture is allowed to foam to a light brown cellular structured polymer.

EXAMPLE 10

Preparation of N,N'-bis(2,5-dimethyl-3,4-dihydro-2H-pyran-2-methyl)phthalamide 14.1 parts 2-aminomethyl-2,5-dimethyl-3,4-dihydro-2H-pyran, 9.7 parts dimethyl phthalate, and 1.25 parts by volume of sodium methoxide solution in methanol, containing 0.39 part sodium methoxide, are heated at 100–105° C. for 5 hours. The reaction mixture is cooled and is filtered to give 21.5 parts cream coloured solid. Two recrystallisations from a methanol water mixture gives 7.6 parts white crystalline solid M.P. 131° C.

What we claim is:

1. Polymerizable bis-amides of the general formula:

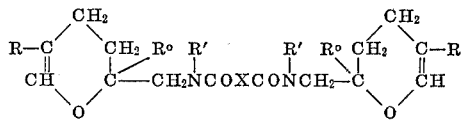

wherein R° and R are members selected from the group consisting of hydrogen, lower alkyl of 1–4 carbon atoms, and chlorine; R' is a member selected from the group consisting of hydrogen, lower alkyl of 1–4 carbon atoms, cyclohexyl, benzyl and phenyl; and X is the residue of a dicarboxylic acid selected from the group consisting of the oxalic acid, saturated aliphatic dicarboxylic acid containing up to 8 carbon atoms in the carbon chain, and benzene dicarboxylic acids.

2. Polymerizable bis-amides as in claim 1, wherein R° and R are members selected from the group consisting of hydrogen and methyl radical.

3. Polymerisable bis-amides as claimed in claim 1 wherein R, R° and R' represent hydrogen atoms.

4. N,N' - bis(3,4 - dihydro-2H-pyran-2-methyl)phthalamide.

5. N,N' - bis(3,4 - dihydro-2H-pyran-2-methyl)adipamide.

6. N,N' - bis(3,4 - dihydro - 2H - pyran-2-methyl)oxamide.

7. N,N' - dimethyl - N,N' - bis(2,5 - dimethyl-3,4-dihydro-2H-pyran-2-methyl)succinamide.

8. N,N' - bis(2,5 - dimethyl - 3,4 - dihydro-2H-pyran-2-methyl)oxamide.

9. N,N' - bis(2,5 - dimethyl - 3,4 - dihydro-2H-pyran-2-methyl)phthalamide.

References Cited

UNITED STATES PATENTS 2,913,452    11/1959    Zech _____ 260—345.7

OTHER REFERENCES

W. J. Hickenbottom: "Reactions of Organic Compounds," (1948) pp. 227–229.

NORMA S. MILESTONE, *Primary Examiner.*

U.S. Cl. X.R.

260—2.5, 78